Jan. 7, 1941. E. KLUMPP 2,227,783
PROCESS FOR DISSOLVING METALLIC COPPER AND REPRECIPITATING THE SAME FROM
THE RESULTING SOLUTION IN METALLIC FORM
Filed Dec. 13, 1938
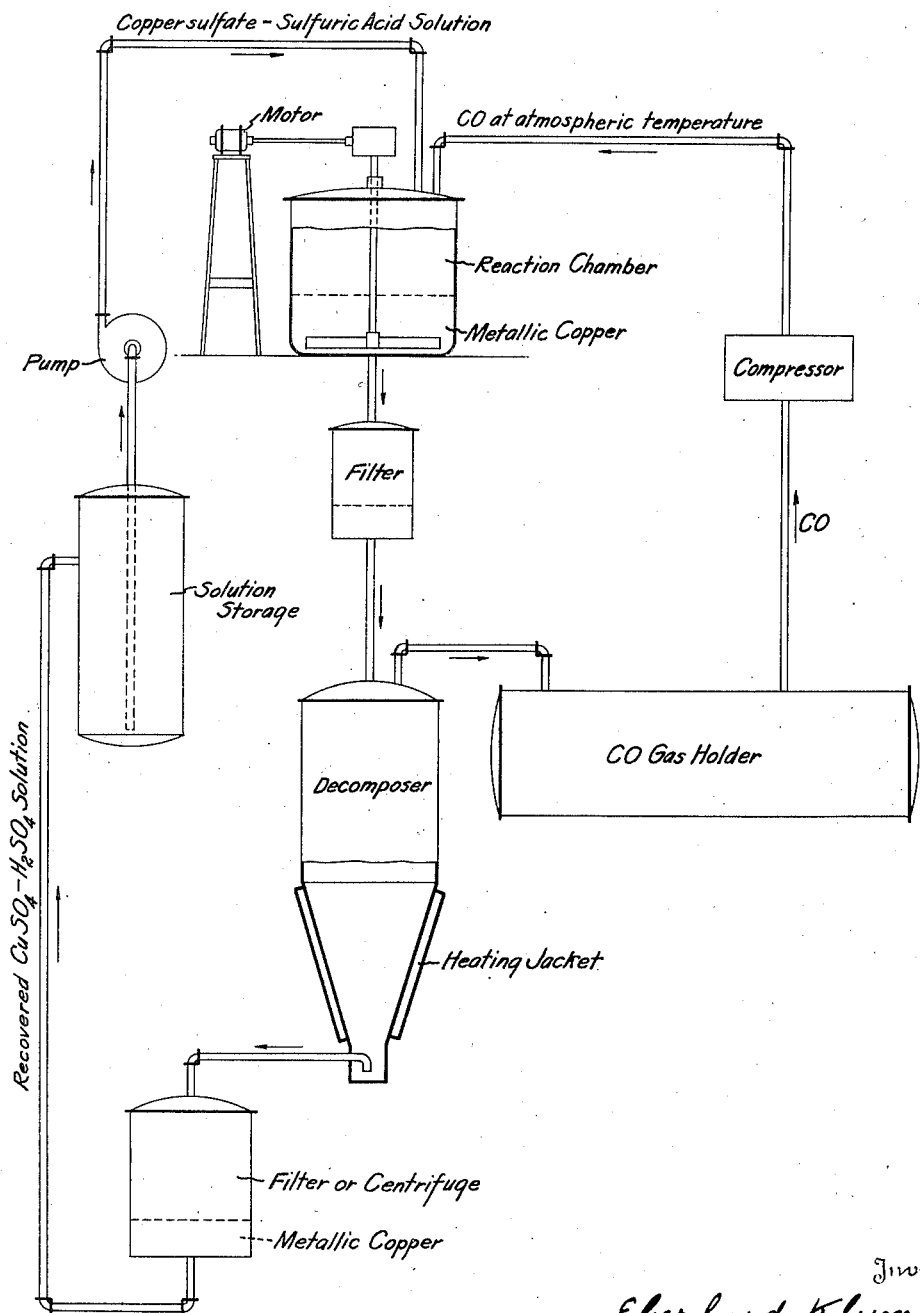
Inventor:
Eberhard Klumpp.
By Potter, Pierce & Scheffler
his Attorneys.

Patented Jan. 7, 1941

2,227,783

UNITED STATES PATENT OFFICE 2,227,783

PROCESS FOR DISSOLVING METALLIC COPPER AND REPRECIPITATING THE SAME FROM THE RESULTING SOLUTION IN METALLIC FORM

Eberhard Klumpp, Hamburg, Germany, assignor to Norddeutsche Affinarie, Hamburg, Germany Application December 13, 1938, Serial No. 245,534
In Germany December 20, 1937

12 Claims. (Cl. 75—117)

The invention relates to a process for dissolving metallic copper in an aqueous liquid and reprecipitating the same from the resulting solution in metallic form.

The invention further relates to the conversion of metallic copper from one crystalline form into another or into crystals of a different size, by the aforesaid method.

A further feature of the invention is that by the same means it is possible to free copper—for example crude copper prodouced by metallurgical means—from impurities contained therein.

Yet another feature of the invention is the carrying out of the foregoing processes as a recycling operation, with continual re-use of the substances employed to dissolve the copper.

Further advantages obtainable by means of the present invention will be apparent as the description thereof proceeds.

It is known that when carbon monoxide is introduced into a cupric sulphate solution containing metallic copper dispersed therein, a small amount of copper is dissolved, and that when this solution is heated under a pressure of 2 to 3 mm. mercury some copper separates therefrom in the form of a thin pellicle. It has also been observed that ethylene and acetylene dissolve in solutions in which cuprous salt is present or forms. No practical conclusions have hitherto been drawn from these observations.

It has unexpectedly been ascertained in accordance with the present invention that large amounts of copper can be dissolved at great speed and re-separated from the solution in metallic crystalline form in a very short time, if the reaction of the copper with a solution of cupric sulphate, containing free sulphuric acid, and carbon monoxide be allowed to proceed under elevated pressure and the resulting solution, which contains the dissolved copper in the form of a double compound between cuprous sulphate and carbon monoxide probably of the formula

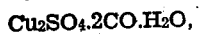

$Cu_2SO_4.2CO.H_2O$, be exposed to conditions of temperature and pressure under which decomposition of said double compound takes place, while metallic copper is separated in crystalline form accompanied by the re-formation of cupric sulphate and liberation of carbon monoxide.

The copper reacts with the cupric sulphate solution and the carbon monoxide most advantageously at elevated temperature, for example at a temperature of about 100°. However, depending on the other existing or desired working conditions, higher or lower temperatures may also be employed, the temperatures to be employed in each case depending also from case to case on practical considerations, for example on the pressure available and the desired duration of the solution process. Temperatures below 130° C. preferably are employed however since at higher temperatures undesirable reactions are likely to occur.

The content of cupric sulphate in the solution, and also the acidity, may vary within wide limits. The pH value of the solution is advantageously made so low that hydrolytic dissociation of the cuprous salt formed, accompanied by separation of cuprous oxide—which would contaminate the metallic copper separated—cannot occur. On the other hand, amounts of acid which would impair the solubility of the copper salts or the carbon monoxide double compound to an undesirable extent are likewise to be avoided.

The access of atmospheric oxygen is to be avoided, firstly because the oxygen is quickly absorbed by the solution, thus oxidising the cuprous salt to cupric salt, whereby acid is consumed and the separation of copper free from lower oxide is rendered impossible, and secondly because of the danger of explosion.

It has further been found that the manner in which the reagents are caused to act on one another during the process of solution, is of considerable importance to the rapidity of its progress and that the velocity of solution increases proportionately to the increase in surface with which the copper and the carbon monoxide are employed in relation to the cupric sulphate solution and to the increase in intensity of the movement of the liquid relatively to the surface of the copper.

It has been found to be very advantageous to arrange matters such that the action of the carbon monoxide (which is, for example, introduced into the liquid in a very finely divided condition) on the copper takes place in such a way that the latter is always separated from the gas flowing past its surface only by a layer of the liquid which is as thin as possible and is preferably continually renewed.

The most favourable reaction conditions possible can be obtained in this connection, for example, if the reaction be carried out in a pressure-tight container in which the copper, employed, for example, in the form of granules, is kept in constant movement by a stirring apparatus, preferably in such a way that it is not entirely covered by the liquid. Favourable working conditions are also obtained by operating in a rotary drum with continuous rotation of the copper, introduced in the form of small lumps, and the liquid. Shaft-shaped chambers are employed with particular advantage, for example after the style of the well-known reaction towers, which are charged with the copper, for example in the form of shavings or bars which are irrigated from above with an acidulated cupric sulphate solution, while carbon monoxide is passed through the reaction tower either from below upwards or from above downwards.

The reaction may also be carried out in the most diverse other ways, as a further example of which only the circulating of the solution saturated with carbon monoxide at one point (advantageously in a very finely divided condition) through the copper (located elsewhere) by means of a pump, will be mentioned.

The pressure employed in the solution process may also vary extensively depending on the desired rate of solution and the other existing working conditions, particularly the nature of the solution employed. It is dependent on the temperature employed in that it must exceed the decomposition pressure of the cuprous sulphate-carbon monoxide double compound at the prevailing temperature. The solution process is accelerated both by pressure and by temperature increases.

After solution of the desired amount of copper, the dissolved copper is separated again in metallic form, as a result of the decomposition of the aforesaid double compound, in accordance with the invention, by raising the temperature beyond the decomposition temperature of the double compound at the prevailing pressure which is kept constant, or by reducing the pressure below the decomposition pressure of the double compound at the prevailing temperature while the latter remains unchanged. These two measures may also be employed contemporaneously, by raising the temperature and simultaneously reducing the pressure. It should be borne in mind that, as it has been found, the conditions of pressure and temperature effective for the decomposition of the double compound are also dependent to a certain extent on the amount of the double compound contained in the liquid.

The possibility of the re-separation of the dissolved copper merely by raising the temperature without reducing the pressure affords the advantage that in this way the recrystallisation of the copper can be carried out under elevated pressure in a closed continuous circulation process merely by alternately supplying and withdrawing heat without the necessity of compressing the carbon monoxide each time to the desired pressure. This is of considerable importance, particularly inasmuch as heat is generally relatively cheaply available, for example in the form of the sensible heat of hot waste gases and the like, at the points in foundries where crude copper is yielded.

The solution and re-separation of the copper may be carried out, for example, under unvarying pressure merely by supplying and withdrawing heat, by first passing the cupric sulphate solution, with recycling, through a chamber in which it is charged with copper at a temperature lying below the decomposition temperature of the double compound, and then through another chamber in which the dissolved copper is extracted from it again by heating to a temperature lying above the decomposition point at the same pressure.

According to the present invention it is thus now possible, by using cupric sulphate and carbon monoxide, to purify large amounts of copper in the simplest manner and in the shortest time, while recovering the auxiliary substances employed in such a form that they can immediately be used again for the same purpose, thus enabling the solution and re-precipitation of copper to be carried out in a continuous recycling operation.

It has further been found that the process of solution can be accelerated by the formation of local elements, for example with the co-operation of the impurities in the crude copper treated, and also by means of catalysts, such as halogen ions. The use of such catalysts for example, by adding hydrochloric acid, has been found particularly advantageous, for example, when treating certain types of copper highly contaminated by less noble metals, such as lead.

Before the re-precipitation of the copper, the resulting solution which is contaminated, for example by constituents of the crude copper which have not dissolved, is preferably freed from these undissolved constituents, for example by filtration, in order to obviate contamination therewith of the copper crystals separated.

It is therefore possible, according to the invention, to produce, even from very greatly contaminated copper, a copper of very great purity in a single working operation, whereas in the electrolytic process hitherto customary for the refining of copper considerable technical and economic difficulties are caused even by only small amounts of impurities.

A further important advantage of the refining process according to the present invention, by comparison with the customary electrolytic process, consists in the far smaller requirements of power—if desired restricted merely to the supply of the sensible heat of waste gases—as compared with the higher consumption of electric current needed in electrolysis, and in the incomparably more intensive utilisation of space, i. e. in the possibility of obtaining far greater outputs in relatively small apparatus, for example of purifying with the aid of a reaction apparatus having a capacity of 1 cubic metre of solution and a decomposer having a useful capacity likewise of 1 cubic metre, from 600 to 1000 kg. of copper per hour, whereas by known electrolytic processes, under normal conditions, only about 2 kg. of copper can be refined per 1 cubic metre of reaction space per hour.

Finally, the present process affords the further advantage that, as it has further been found, the selection of the working conditions in the separation of the copper enables the shape and size of the copper crystals separated to be influenced to a great extent.

It has further been found that when working according to the present invention it is possible to employ, instead of or in addition to carbon monoxide, also unsaturated hydrocarbons, such as those of the series of the formulae $C_nH_{2n}$ to $C_nH_{2n-6}$, such as ethylene, acetylene, butadiene and the like. It has been found further that the oxygen containing derivatives of these unsaturated hydrocarbons and their homologues can be used, for example alcohols, such as allyl alcohol and propargyl alcohol, aldehydes, such as acrolein and crotonic aldehyde, and also acids, such as acrylic acid, crotonic acid, propionic acid, maleic acid and cinnamic acid. The preference should generally be given to those substances the boiling points of which lie below the boiling temperature of water or of the copper salt solution used, for example allyl alcohol or acrolein, because the separation of these substances from the solution by distillation after decomposition of the cuprous salt double compound is thereby facilitated.

In some cases particularly advantageous use may also be made of mixtures of various substances of the above-specified type, including, for example, mixtures of substances having a lower boiling point than water, such as carbon monoxide, allyl alcohol or acrolein, with higher boiling substances, for example substances having a higher boiling point than water or the copper salt solution, whereby, inter alia, it is possible to regulate the temperature conditions to a great extent, in any desired direction in each particular case, during the solution and during the re-precipitation of the copper. In certain cases, for example when using ethylene or allyl alcohol, the solution of the copper and the formation of a double compound of cuprous sulphate with the other component take place at such a speed, even at ordinary temperature, that it is possible to dispense with heating of the reaction liquid during the solution process.

According to a further method of carrying out the invention, it is possible to employ, instead of or in addition to solutions of cupric sulphate, the solutions of cupric salts of other acids, such as aromatic sulpho acids (such as benzenesulphonic acid and cresolsulphonic acids), and fluoroboric acid and phosphoric acid, the cuprous salts of which are able to add on copper in the form of a double compound with carbon monoxide or other carboniferous, e. g. unsaturated compound used, without forming compounds insoluble in the reaction liquid, and to separate the copper again in metallic form on suitable alteration of the conditions of temperature and pressure.

The accompanying drawing is a flow diagram illustrating a typical procedure in accordance with the invention.

Example I 1 litre of a solution containing 400 grms. of $CuSO_4.5H_2O$ and 50 grms. of $H_2SO_4$ is allowed to act for 5 minutes at from 100 to 110° C. on copper granules in an autoclave provided with stirring mechanism, while introducing carbon monoxide at a pressure of 8 atmospheres in excess of atmospheric, the copper granules being present in such amounts that a portion thereof is always not covered by the solution. 98 grms. of copper are thereby dissolved. The solution is filtered under the same pressure and then heated to 120° C. under the same pressure, whereupon 96 grms. of metallic copper are separated out in the form of fine crystals, which are freed, for example, in a centrifuge from the solution adhering thereto and, after washing with water and drying, are obtained in completely pure form.

The solution separated from the precipitated copper may, similarly as with the carbon monoxide evolved on decomposition of the cuprous sulphate-carbon monoxide double compound, be used afresh for dissolving copper and, after precipitation of the latter, may be used repeatedly for dissolving and precipitating copper in the hereindescribed manner. Even when it is used repeatedly in this manner, the amount of copper precipitated on each occasion corresponds practically exactly with the amount of copper previously dissolved.

Example II

A copper solution obtained as set forth in Example I at 100 to 110° C. under a pressure of 8 atmospheres in excess of atmospheric, is cooled to 40°, then decompressed, filtered and then heated to 100° C. at atmospheric pressure. 97 grms. of metallic copper are then separated in the form of fine crystals.

With the solution separated from the copper the process of solution and re-precipitation of copper can be carried out again and again in the hereindescribed manner with the same result.

Example III 400 ccm. of a solution containing 35 grms. of copper in the form of copper benzene sulphonate and 50 ccm. of excess benzenesulphonic acid are treated with carbon monoxide under a pressure of 8 atmospheres at 90° C., with vigorous stirring, in the presence of metallic copper, for ten minutes. The resulting solution is cooled, then decompressed, filtered and then heated to boiling point. During the heating the absorbed carbon monoxide and 30 grms. of copper separate from the solution, while the original solution of copper benzene sulphonate is re-formed.

Example IV 550 ccm. of a solution containing 38 grms. of copper dissolved in excess phosphoric acid, in the form of acid phosphate, are treated for 20 minutes, with stirring, with carbon monoxide under a pressure of 8 atmospheres in the presence of metallic copper, at a temperature of 95 to 105° C. The solution formed is cooled while maintaining said pressure, then decompressed and then filtered and finally decomposed by boiling at atmospheric pressure. During the heating carbon monoxide is liberated and 20 grms. of copper are separated, the original solution of copper salt being re-formed.

Example V 500 ccm. of a solution containing 26 grms. of copper in the form of copper cresol-sulphate and 50 ccm. of excess cresol-sulphuric acid are treated at 80° with carbon monoxide for 15 minutes at a pressure of 8 atmospheres and in the presence of copper, the mixture being stirred the while. The resulting solution is cooled while maintaining said pressure, filtered at said pressure, decompressed and then boiled at atmospheric pressure. During the boiling 21 grms. of metallic copper separates and is filtered off while the CO is liberated and the original solution re-forms.

Example VI 500 ccm. of a solution containing 25 grms. of copper fluoborate and 25 ccm. of free fluoboric acid are treated with carbon monoxide for 10 minutes at a pressure of 8 atmospheres and a temperature of 90° C. in the presence of metallic copper, the mixture being vigorously stirred. The resulting solution is cooled and filtered while maintaining said pressure, then decompressed and boiled. As a result of the boiling 21 grms. of metallic copper are separated out, the original solution being re-formed and carbon monoxide being split off.

Example VII 250 ccm. of a solution containing 125 grms. of $CuSO_4.5H_2O$ and 40 grms. of excess $H_2SO_4$ are treated with ethylene for ten minutes at 6 atmospheres and a temperature of 40° in the presence of metallic copper, the mixture being vigorously stirred. The resulting solution is cooled and filtered while maintaining said pressure, then decompressed and freed from ethylene by boiling at atmospheric pressure. During the boiling 12 grms. of metallic copper, which is filtered off, is thus separated, the original solution being reformed.

Example VIII 300 ccm. of a solution containing 75 grms. of copper sulphate and 30 grms. of concentrated sulphuric acid are mixed with 45 grms. of allyl alcohol and intensely stirred up for 10 minutes at normal temperature and at atmospheric pressure with excess copper, with exclusion of air. The solution, which forms with slight evolution of heat, is then filtered at atmospheric pressure and then heated in vacuo. The allyl alcohol is liberated from the solution during the heating, while the original solution reforms and 12 grms. of metallic copper are precipitated.

I claim:

1. A process for dissolving metallic copper and re-precipitating the same from the resulting solution in metallic form, which comprises producing a solution of a double compound of cuprous sulphate and carbon monoxide by allowing metallic copper and carbon monoxide to act on an acid solution containing cupric sulphate at a pressure higher than atmospheric, decomposing the first-mentioned solution into metallic copper and a solution of cupric sulphate by raising the temperature and/or lowering the pressure, carbon monoxide being split off, and separating from the solution the precipitated copper.

2. A process for dissolving metallic copper and re-precipitating the same from the resulting solution in metallic form, which comprises producing a solution of a double compound of cuprous sulphate and carbon monoxide by allowing metallic copper and carbon monoxide to act on an acid solution containing cupric sulphate at a pressure higher than atmospheric and at elevated temperature, decomposing the first-mentioned solution into metallic copper and a solution of cupric sulphate by raising the temperature and/or lowering the pressure, carbon monoxide being split off, and separating from the solution the precipitated copper.

3. A process for dissolving metallic copper and re-precipitating the same from the resulting solution in metallic form, which comprises producing a solution of a double compound of cuprous sulphate and carbon monoxide by allowing metallic copper and carbon monoxide to act on an acid solution containing cupric sulphate at a pressure higher than atmospheric and at a temperature of about 100 to 110° C. decomposing the first-mentioned solution into metallic copper and a solution of cupric sulphate by raising the temperature and/or lowering the pressure, carbon monoxide being split off, and separating from the solution the precipitated copper.

4. A process for dissolving metallic copper and re-precipitating the same from the resulting solution in metallic form, which comprises producing a solution of a double compound of cuprous sulphate and carbon monoxide by allowing metallic copper having a large superficial area and carbon monoxide to act on an acid solution containing cupric sulphate at a pressure higher than atmospheric, decomposing the first-mentioned solution into metallic copper and a solution of cupric sulphate by raising the temperature and/or lowering the pressure, carbon monoxide being split off, and separating from the solution the precipitated copper.

5. A process for dissolving metallic copper and re-precipitating the same from the resulting solution in metallic form, which comprises producing a solution of a double compound of cuprous sulphate and carbon monoxide by allowing metallic copper and carbon monoxide to act on an acid solution containing cupric sulphate at a pressure higher than atmospheric while constantly supplying fresh liquid to the surface of the copper, decomposing the first-mentioned solution into metallic copper and a solution of cupric sulphate by raising the temperature and/or lowering the pressure, carbon monoxide being split off, and separating from the solution the precipitated copper.

6. A process for dissolving metallic copper and re-precipitating the same from the resulting solution in metallic form, which comprises producing a solution of a double compound of cuprous sulphate and carbon monoxide by allowing metallic copper and carbon monoxide to act on an acid solution containing cupric sulphate at a pressure higher than atmospheric and in the presence of halogen ions, decomposing the first-mentioned solution into metallic copper and a solution of cupric sulphate by raising the temperature and/or lowering the pressure, carbon monoxide being split off, and separating from the solution the precipitated copper.

7. A process for dissolving metallic copper and re-precipitating the same from the resulting solution in metallic form, which comprises allowing metallic copper and carbon monoxide to act on an acid solution of at least one cupric salt of an acid of the group of acids the cuprous salts of which like the cuprous salts of the aromatic sulpho-acids, hydrofluoboric acid and phosphoric acid are able to combine with carbon monoxide in the form of a double compound, without forming compounds insoluble in the reaction liquid, and to precipitate the dissolved copper again in metallic form on a suitable alteration of the temperature and/or pressure, at a pressure higher than atmospheric, to produce a solution of a double compound of the cuprous salt of the acid in question with carbon monoxide, decomposing the resulting solution into metallic copper and a solution of the cupric salt of the acid employed by raising the temperature and/or reducing the pressure, carbon monoxide being split off, and separating from the solution the copper precipitated.

8. A process for dissolving metallic copper and re-precipitating the same from the resulting solution in metallic form, which consists in allowing metallic copper and an unsaturated carbon compound of the group consisting of carbon monoxide, unsaturated hydrocarbons and the alcohols, aldehydes and carboxylic acids derived therefrom, to act at a pressure higher than atmospheric on an acid solution of at least one cupric salt of an acid of the group of acids the cuprous salts of which like the cuprous salts of sulphuric acid, the aromatic sulpho acids, hydrofluoboric acid and phosphoric acid are able to combine with the unsaturated carbon compound in the form of a double compound without forming compounds insoluble in the reaction liquid, and of precipitating the dissolved copper again in metallic form on suitable alteration of the temperature and/or pressure in order to form a solution of the double compound of at least one of the cuprous salts of the abovementioned acids with at least one of the abovementioned carbon compounds, decomposing the resulting solution into metallic copper and a solution of the cupric salt of the acid utilised by raising the temperature and/or reducing the pressure, carbon compound being split off, and separating from the solution the precipitated copper.

9. Process as claimed in claim 8, wherein the unsaturated carbon compound employed has a lower boiling point than that of the salt solution.

10. A process for dissolving metallic copper and re-precipitating the same from the resulting solution in metallic form, which comprises allowing metallic copper and an unsaturated carbon compound of the group consisting of carbon monoxide and the hydrocarbons of the formula series $C_nH_{2n}$ to $C_nH_{2n-6}$, and the alcohols, aldehydes and carboxylic acids derived therefrom, to act, at a higher pressure than atmospheric, on an acid solution of at least one cupric salt of an acid of the group of acids the cuprous salts of which like the cuprous salts of sulphuric acid, the aromatic sulpho acids, hydrofluoboric acid and phosphoric acid are able to combine with the carbon compound in the form of a double compound without forming compounds insoluble in the reaction liquid, and of re-precipitating the dissolved copper in metallic form on suitable alteration of the temperature and/or pressure, in order to form a solution of a double compound of at least one of the cuprous salts of the aforesaid acids with at least one of the aforesaid carbon compounds, decomposing the resulting solution into metallic copper and a solution of the cupric salt of the acid employed, by raising the temperature and/or reducing the pressure, carbon compound being split off, and separating from the solution the precipitated copper.

11. A process for dissolving metallic copper and re-precipitating the same from the resulting solution in metallic form, which comprises allowing metallic copper and carbon monoxide to act at a higher pressure than atmospheric on an acid solution containing cupric sulphate to produce a solution of a double compound of cuprous sulphate and carbon monoxide, decomposing the latter solution, by heating above the decomposition temperature of the cuprous sulphate-carbon monoxide double compound at the prevailing pressure, into carbon monoxide, a solution of cupric sulphate and metallic copper, separating the latter from the solution at the temperature of decomposition and without reducing the pressure, then cooling the solution down to a temperature below the decomposition temperature of the cuprous sulphate-carbon monoxide double compound at the prevailing pressure and causing said solution to act at this temperature and pressure on fresh copper.

12. A process for dissolving metallic copper and re-precipitating the same from the resulting solution in metallic form, which comprises allowing metallic copper and allyl alcohol to act at a higher pressure than atmospheric on an acid solution of at least one cupric salt of an acid of the group of acids the cuprous salts of which like the cuprous salts of sulphuric acid, the aromatic sulpho acids, hydrofluoboric acid and phosphoric acid are able to combine with allyl alcohol in the form of a double compound without forming compounds insoluble in the reaction liquid, and to re-precipitate the dissolved copper in metallic form on suitable alteration of the temperature and/or pressure, to produce a solution of a double compound of at least one of the cuprous salts of the aforesaid acids with allyl alcohol, decomposing the resulting solution into metallic copper and a solution of the cupric salt of the acid employed by raising the temperature and/or reducing the pressure, allyl alcohol being split off, and separating from the solution the precipitated copper.

EBERHARD KLUMPP.